(12) United States Patent
Powell et al.

(10) Patent No.: US 7,093,659 B2
(45) Date of Patent: Aug. 22, 2006

(54) CONTROLLING CHLORITE OR HYPOCHLORITE BREAK RATE OF WELL TREATMENT FLUIDS USING MAGNESIUM OR CALCIUM IONS

(75) Inventors: Ronald J. Powell, Duncan, OK (US); Robert Hauge, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/681,976

(22) Filed: Mar. 22, 2004

(65) Prior Publication Data

US 2005/0205259 A1    Sep. 22, 2005

(51) Int. Cl.
E21B 43/26    (2006.01)

(52) U.S. Cl. ................. 166/300; 166/308.3; 166/308.5

(58) Field of Classification Search ...................... None
See application file for complete search history.

(56) References Cited

U.S. PATENT DOCUMENTS

| | | | |
|---|---|---|---|
| 4,961,466 A | 10/1990 | Himes et al. | 166/250 |
| 5,067,565 A | 11/1991 | Holtmyer et al. | 166/305 |
| 5,413,178 A | 5/1995 | Walker et al. | 166/300 |
| 5,624,886 A | 4/1997 | Dawson et al. | 507/217 |
| 5,669,446 A | 9/1997 | Walker et al. | 166/300 |
| 5,669,447 A | 9/1997 | Walker et al. | 166/300 |
| 5,950,731 A | 9/1999 | Shuchart et al. | 166/300 |
| 6,176,315 B1 | 1/2001 | Reddy et al. | 166/295 |
| 6,213,213 B1 | 4/2001 | Van Batenburg et al. | 166/300 |
| 6,214,773 B1 | 4/2001 | Harris et al. | 507/271 |
| 6,342,467 B1 | 1/2002 | Chang et al. | 507/110 |
| 6,357,527 B1 | 3/2002 | Norman et al. | 166/300 |
| 6,488,091 B1 * | 12/2002 | Weaver et al. | 166/300 |
| 6,494,263 B1 | 12/2002 | Todd | 166/312 |
| 6,702,023 B1 * | 3/2004 | Harris et al. | 166/307 |
| 2002/0125012 A1 * | 9/2002 | Dawson et al. | 166/300 |

* cited by examiner

Primary Examiner—Zakiya W. Bates
(74) Attorney, Agent, or Firm—Robert A. Kent; Crutsinger & Booth

(57) ABSTRACT

Methods and compositions are provided for treating a subterranean formation penetrated by a well. The method includes the steps of: (a) forming a treatment fluid, and (b) introducing the treatment fluid into the well and into contact with the formation. The treatment fluid includes: (1) water; (2) a water-soluble polysaccoharide capable of increasing the viscosity of the water or a water-soluble polysaccharide and a crosslinking agent for the water-soluble polysaccharide; (3) a breaker comprising at least one member selected from the group consisting of a source of chlorite ions and a source of hypochlorite ions; and (4) a breaker moderator comprising at least one member selected from the group consisting of a source of magnesium ions and a source of calcium ions.

37 Claims, 3 Drawing Sheets

CONTROLLING CHLORITE OR HYPOCHLORITE BREAK RATE OF WELL TREATMENT FLUIDS USING MAGNESIUM OR CALCIUM IONS

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention generally relates to the field of methods and compositions for well stimulation or other treating of subterranean formations. More specifically, the invention is directed to methods and compositions for controlling the cholorite or hypochlorite break rate on the viscosity of treatment fluids used in the stimulation or other treatment of subterranean formations.

BACKGROUND OF THE INVENTION

Fracturing or other treatment processes are conventionally used to increase hydrocarbon conductivity through subterranean formations. Fracturing or other stimulation procedures are usually performed in production wells. However, injection wells used in secondary or tertiary recovery operations may also be fractured or otherwise treated to facilitate the injection of fluids into subterranean formations.

Hydraulic fracturing includes injecting a fracturing fluid into the well at a pressure sufficient to cause one or more cracks or "fractures" in the formation. Usually the fracturing fluid is a gel, an emulsion, or a foam for carrying a proppant, such as sand or other particulate material, into the fracture. The fracturing fluid is made to have a sufficiently high viscosity to retain the proppant in suspension or at least to reduce the tendency of the proppant to settle out of the fracturing fluid as the fracturing fluid flows through the well and into the newly-created fracture.

Once the fracturing fluid carrying the proppant has been pumped into the formation, the high-viscosity of the fluid is then "broken" to deposit the proppant in the fracture and allow the fluid to flow back from the formation. Breaking the gel entails the conversion of the gelled or emulsified high-viscosity fluid into a low-viscosity fluid.

After the treatment, the newly-created fractures, which are held open by the proppant, provide increased fluid conductivity through the formation. This can dramatically increase the hydrocarbon production from the formation, through the fracture, and into the well bore.

In an aqueous fracturing fluid, a gelation agent and/or an emulsifier are used to gel or emulsify the fracturing fluid and provide the required high viscosity to carry the proppant. A "breaker," or a viscosity-reducing agent, is added to the fracturing fluid prior to pumping the fracturing fluid into the subterranean formation.

The treatment fluid's effectiveness depends largely on the ability to control the timing of when the high viscosity of the fluid is broken. If the high-viscosity fluid breaks too soon, the proppant will settle out of the fracturing fluid in the well bore, before it is carried into the formation. If the high-viscosity fluid takes too long to break, valuable hydrocarbon production may be lost, or worse, the formation may be permanently damaged by the long "shut in" time.

Controlling the timing of the breaking of the high-viscosity treatment fluids has been difficult. Breaking of the fluid can be unreliable often resulting s in premature breaking, excessively delayed breaking, and incomplete breaking of the high-viscosity treatment fluid. The ability to control the fluid degradation rate is essential to a successful stimulation treatment. While most fracturing fluids will break, even in the presence of a gel stabilizer, if shut-in for a sufficient time, it is most desirable to return the well back to production as quickly as possible. The break time for gelled fluids is usually desired to be within 1 to 24 hours after introduction into the subterranean formation.

Temperature is a major factor in the chemistry of breaking fluids. The break rate tends to increase dramatically with increasing temperature. Further, the stability of the gelled fluids tends to decrease and the stability of the breaker also can become a problem. Thus, the ability to control the timing of breaking the fluid becomes increasingly difficult in formations having higher static temperatures.

For example, at static temperatures up to about 200° F., conventional oxidizing breakers such as alkali metal or ammonium persulfates, sodium perborate, and t-butyl hydroperoxide have been used as breakers for treatment fluids. Laboratory evaluations are routinely made before the treatment to find the breaker concentration necessary to cause a reasonable rate of viscosity decline. However, above 180° F., the conventional breakers have been difficult to control and often result in premature breaking of the treatment fluids.

At static temperatures near and above 200° F., alkali metal chlorite, lithium hypochlorite, or sodium hypochlorite activated with an amine and/or copper ion have been used as breakers for treatment fluids. These have been partially effective at such higher temperatures. However, alkali metal chlorite, lithium hypochlorite, or sodium hypochlorite breakers often exhibit inconsistent degradation rates.

Attempts to slow or control the break rate of guar-based fracturing fluids have been made by decreasing the breaker concentration that is added to the treatment fluid. In field practice, this technique works to a degree, but the minute concentrations required for a controlled break of some applications are not practical. Also, there are several drawbacks associated with this approach to control break rate. For example, at very low chlorite concentration, incomplete fluid breaking is often encountered. Further, low chlorite concentrations are often difficult to meter and susceptible to inhibition or degradation.

Thus, the break rate of chlorite and hypochlorite breakers has been difficult to control in the past, which has limited the application of these breakers in stimulation operations such as fracturing. Therefore, there is a need to provide a means by which the break rate of chlorite and hypochlorite breakers could better controlled in well treatment fluids.

SUMMARY OF THE INVENTION

The present invention provides various methods of treating a subterranean formation penetrated by a well.

According to one aspect of the invention, a method of treating a subterranean formation comprises the steps of: (a) forming a treatment fluid comprising: (1) water; (2) a water-soluble polysaccharide capable of increasing the viscosity of the water and present in a sufficient concentration to increase the viscosity of the water; (3) a breaker comprising at least one member selected from the group consisting of a source of chlorite ions and a source of hypochlorite ions, wherein the breaker is present in a sufficient concentration to break the viscosity of the treatment fluid after introduction of the fluid into the subterranean formation; and (4) a breaker moderator comprising at least one member selected from the group consisting of a source of magnesium ions and a source of calcium ions, wherein the breaker moderator is present in a sufficient concentration to control the break rate of the fluid; and (b) introducing the treatment fluid into the well and into contact with the formation.

According to a different aspect of the invention, a method of treating a subterranean formation comprises the steps of: (a) forming a treatment fluid, comprising: (1) water; (2) a water-soluble polysaccharide and a crosslinking agent for the water-soluble polysaccharide, which are present in a sufficient concentration to effect crosslinking of the of the polysaccharide and increase the viscosity of the water; (3) a breaker comprising at least one member selected from the group consisting of a source of chlorite ions and a source of hypochlorite ions, wherein the breaker is present in a sufficient concentration to break the viscosity of the treatment fluid after introduction of the fluid into the subterranean formation; and (4) a breaker moderator comprising at least one member selected from the group consisting of a source of magnesium ions and a source of calcium ions, wherein the breaker moderator is present in a sufficient concentration to control the break rate of the fluid; and (b) introducing the treatment fluid into the well and into contact with the formation.

Although useful at lower temperatures, the methods according to the invention are advantageously employed where the formation has a static temperature of about 200° F. and above. Although the methods according to the invention may also be useful at much higher temperatures, they are most advantageously employed at a temperature of up to about 350° F.

The methods of the invention are also advantageously employed in hydraulic fracturing, where the step of introducing the treatment fluid into the well and into contact with the formation is at a rate and pressure sufficient to fracture the formation. In hydraulic fracturing, the treatment fluid can further comprise a proppant.

According to the presently most preferred embodiments of the invention, the treatment fluid is adapted to break within about 1 to 24 hours after being introduced into the well and into contact with the formation, as soon as the fracture or fractures close upon the proppant. Preferably, the treatment fluid breaks within 6 to 24 hours for at least one temperature in the range of 200° F. to 300° F.

According to further aspects of the invention, the invention includes compositions of well treatment fluids that may be employed in such well treatment processes.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims. The compositions can comprise, consist essentially of, or consist of the stated materials. The method can comprise, consist essentially of, or consist of the stated steps with the stated materials.

BRIEF DESCRIPTION OF THE DRAWINGS

The accompanying views of the drawing are incorporated into and form a part of the specification to illustrate several aspects and examples of the present invention, wherein like reference numbers refer to like parts throughout the figures of the drawing. These figures together with the description serve to explain the general principles of the invention. The figures are only for the purpose of illustrating preferred and alternative examples of how the various aspects of the invention can be made and used and are not to be construed as limiting the invention to only the illustrated and described examples. The various advantages and features of the various aspects of the present invention will be apparent from a consideration of the drawings, in which.

Figure 1:
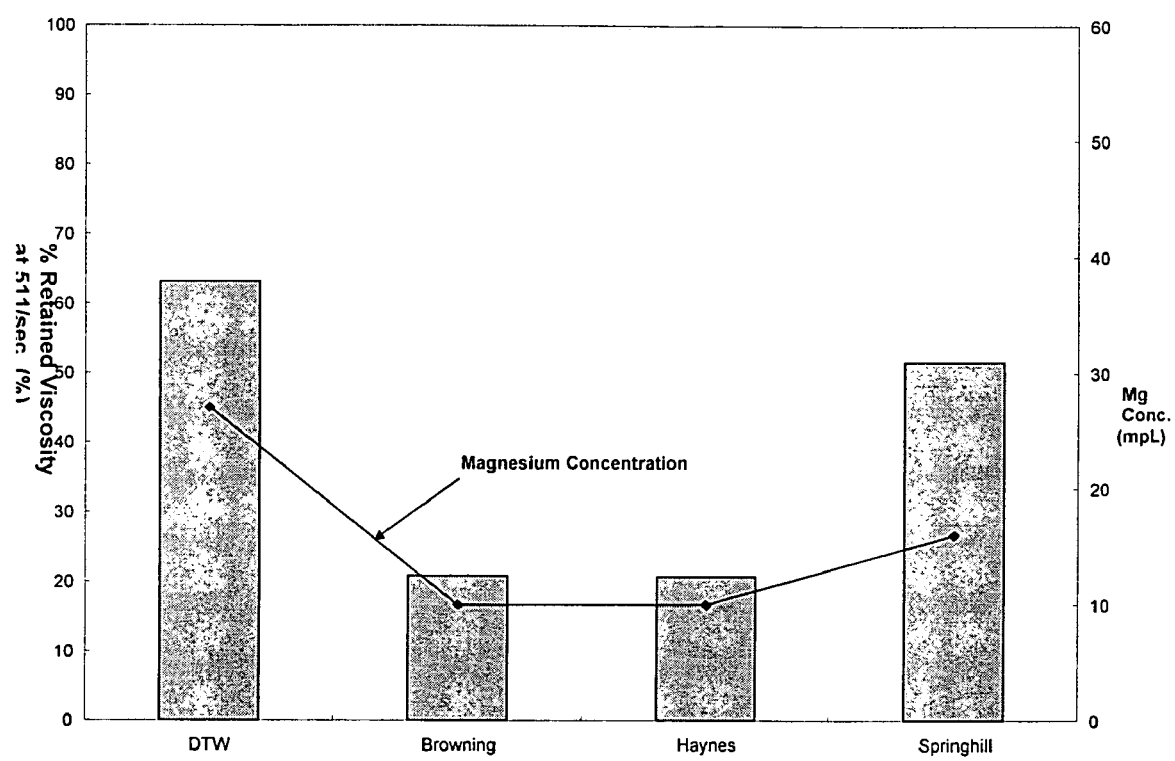
FIG. 1 illustrates results of static break tests at 270° F., comparing the break of guar-based samples made with Duncan tap water, which contains a relatively high concentration of magnesium ions, to the break of gelled fluid samples made with other sources of fresh water, where the degree of break is reported as a percentage of the ratio of sample viscosity with sodium chlorite to sample viscosity without sodium chlorite.

DETAILED DESCRIPTION OF PRESENTLY MOST PREFERED EMBODIMETNS AND CURRENT BEST MODE

The aqueous solution for use with the viscosifying agent can use fresh water, salt water, brine, or any other aqueous liquid that does not adversely affect the treatment fluid. For example, one or more salts, such as potassium chloride or tetramethylammonium chloride can also be used in the treatment fluid to inhibit the clay swelling in the subterranean formation being treated.

The present invention comprises a water-soluble polysaccharide, which may or may not require a crosslinking agent to produce a fluid having the desired high viscosity. The polysaccharide can include any natural or derivatized polysaccharide that is soluble in the treatment fluid. The polysaccharide can also be dispersible and/or swellable in aqueous solution.

Preferably, the polysaccharide comprises at least one member selected from the group consisting of galactomanans, modified or derivatized galactomanans and cellulose derivatives. The polysaccharide can also comprise at least one member selected from the group consisting of guar, hydroxypropylguar, carboxymethylhydroxypropylguar, carboxymethylhydroxyethylcellulose, carboxymethylcellulose, and hydroxyethylcellulose grafted with vinylphosphonic acid. One group of polysaccharides that is suitable for use in the present invention includes arabic gum, ghatti gum, karaya gum, tamarind gum, tagacanth gum, guar gum, locust bean gum, and the like. Modified gums such as carboxyalkyl derivatives, like carboxymethyl guar, and hydroxyalkyl derivatives, like hydroxypropyl guar, can also be used. Doubly derivatized gums such as carboxymethylhydroxypropyl guar ("CMHPG") can also be used.

Other viscosifying agents can include modified celluloses and their derivatives, such as cellulose ethers and esters. Preferably, such modified celluloses and their derivatives are water-soluble. Some non-limiting cellulose ethers include various carboxyalkyl cellulose ethers, such as carboxyethyl cellulose ("CEC") and carboxymethyl cellulose ("CMC"); mixed ethers, such as carboxyalkyl ethers, e.g., carboxymethyl hydroxyethyl cellulose ("CMHEC"); hydroxyalkyl celluloses, such as hydroxyethyl cellulose ("HEC") and hydroxypropyl cellulose ("HPC"); alkyhydroxyalkyl celluloses, such as methylhydroxypropyl cellulose; alkyl celluloses, such as methyl cellulose, ethyl cellulose, and propyl cellulose; alkylcarboxyalkyl celluloses, such as ethylcarboxymethyl cellulose; alkylalkyl celluloses, such as methylethylcellulose; hydroxyalkylalkyl celluloses, such as hydroxypropylmethyl cellulose; and the like. A preferred derivatized cellulose is a hydroxyethyl cellulose grafted with vinyl phosphonic acid, such as disclosed in U.S. Pat. No. 5,067,565, issued to Holtmyer, et al. on Nov. 26, 1991, the entire disclosure of which is incorporated herein by reference. The most preferred polysaccharides are the galactomanans, modified or derivative galactomanans, and cellulose derivatives, examples of which are given above.

A crosslinking agent may be employed to crosslink a water-soluble polysaccharide and increase the viscosity of the aqueous liquid. In this case, the polysaccharide can be, but need not be, itself capable of increasing the viscosity of water. Some non-limiting examples of crosslinking agents for use in the present invention include borate-releasing compounds or any of the well-known transition metal ions that are able to crosslink with a selected viscosifying agent. One example of a borate-releasing compound that can be used as a crosslinking agent is sodium tetraborate. Other non-limiting examples of crosslinking agents for use in the present invention include aluminum compounds, zirconium or titanium chelates, antimony compounds, and the like. Thus, a suitable crosslinking agent preferably comprises at least one member selected from the group consisting of borate-releasing compounds, a source of titanium ions, a source of zirconium ions, a source of antimony ions, and a source of aluminum ions. One of the most preferred borate-releasing compounds for use in the present invention comprises ulexite.

Typically, the particular selection of the materials used in the preparation of the treatment fluid of the type described above (sometimes referred to as "Linear Gels") depends on the desired viscosity. In addition, the particular concentration of the selected materials used in the treatment fluid also depends on the desired viscosity.

Further, the desired viscosity depends on the desired well treatment application. For example, in the case of using a proppant in the fluid, the desired viscosity of the fluid is, of course, at least sufficient to suspend and carry the proppant down through the well and into the formation, as known to those skilled in the art. For other applications, the desired viscosity may not be so high.

The breaker for use in the present invention is selected from the group consisting of a source of chlorite ions and a source of hypochlorite ions, wherein the breaker is present in a sufficient concentration to break the viscosified fluid after introduction of the fluid into the subterranean formation. Preferably, the breaker is in at least partially water-soluble form. A source of chlorite ions includes alkali metal chlorite. One example of an alkali metal chlorite is sodium chlorite ($NaClO_2$) which is commercially available by Vulcan Chemical. A source of hypochlorite ions includes alkali metal hypochlorites, such as lithium hypochlorite (LiClO) and sodium hypochlorite (NaClO). In addition to the breaker comprising at least one member selected from the group consisting of a source of chlorite ions and a source of hypochlorite ions, it is expected that other breakers can additionally be used in the treatment fluid, such as various conventional oxidizing breakers.

The breaker concentration in the treatment fluid is at a sufficient concentration to reduce viscosity of the treatment fluid. The degree of viscosity reduction within a desired period of time can vary from a pre-selected lower viscosity to complete breaking of the treatment fluid. The optimum or effective breaker concentration employed in the present invention depends on factors such as the desired injection period, the particular viscosifying agent and its concentration, the particular breaker, the formation temperature, as well as other factors.

The breaker moderator for use in the present invention comprises at least one member selected from the group consisting of a source of magnesium ions and a source of calcium ions, wherein the breaker moderator is present in a sufficient concentration to control the break rate of the fluid. Some non-limiting examples of a source of magnesium ions that are expected to be useful to moderate the breaker include magnesium chloride, magnesium acetate, and magnesium sulfate. Some non-limiting examples of a source of calcium ions that are expected to be useful to moderate chlorite and hypochlorite breakers include calcium chloride, calcium acetate, and calcium nitrate. The concentration of the breaker moderator is that which is sufficient to reduce the viscosity of the treatment fluid within a desired period of time and within a desired temperature range.

The ability to control the rate of fluid viscosity degradation is essential to a successful stimulation treatment. The magnesium or calcium ion concentrations in the treatment fluid that are used in viscosifying fluids affect the fluid's degradation or breaking rate. In other words, the break rate of a fluid that does not contain an effective concentration of magnesium or calcium ions has been found to be faster than a fluid that does contain an effective concentration of magnesium or calcium ions. A faster break rate causes inconsistent or unreliable break rates. Unreliable break rate in a fluid leads to several problems such as incomplete fluid breaking. This problem is magnified when a gel stabilizer is present in the treatment fluid, which is usually added when the treatment fluid is to be used in a formation having a static temperature above about 175° F. For example, in fracturing stimulation treatments, the fluid breaking may be premature and occur before the fracturing job is complete. A fracturing fluid prepared with an effective concentration of magnesium ions or calcium ions compared to those that do not contain effective concentrations of such demonstrate dramatically different break rates. Specifically, a treatment fluid containing effective magnesium ions or calcium ions advantageously exhibits a slower and more predictable break rate, maintains its viscosity for a longer period of time, and has a more stable break rate.

Without being limited by any theoretical explanation, it is currently believed that the observed difference in the break rate of a fluid containing an effective concentration of magnesium ions or calcium ions compared to fluids that do not contain effective concentrations of such may be explained by a mechanism similar to catalytic decomposition of $H_2O_2$. In that system, trace amounts of iron or other transition metals can catalyze the decomposition of $H_2O_2$. Thus, the presence of trace amounts of iron (and other metals such as copper and chromium) must be avoided to prevent decomposition. Both solution and colloidal stabilizers are used. Sodium stannate ($Na_2SnO_3$) is an example of a colloidal type stabilizer, forming colloidal hydrous stannic oxide ($SnO_2.xH_2O$) by hydrolysis, which adsorbs catalytic ions such as ferric ions and hence improves the stability of hydrogen peroxide solutions. Magnesium hydroxide is also a method of stabilizing $H_2O_2$ solutions. Accordingly, it is believed that the removal of trace amounts of transition metals ($Fe^{+3}$, $Co^{2+}$, $Ni^{2+}$, and $Mn^{2+}$), especially of copper, by means of precipitated $Mg(OH)_2$, is believed to be of particular relevance to improve the stability of chlorite and hypochlorite break rates.

Other mechanisms and theories may explain the slower break rate associated with fluids containing an effective concentration of magnesium ions or calcium ions, as compared to treatment fluids that do not contain effective concentrations of such. For example, it may be that magnesium or calcium particulates may provide a means of moderating the effect of chlorite on the guar polymer decomposition. Another theory suggests investigating the effect on the polymer's stability in the presence of magnesium and calcium ions.

The treatment fluid can further include a pH adjusting agent useful for controlling the break rate of alkali metal chlorite, lithium hypochlorite, or sodium hypochlorite. Fluid pH adjustment can be used in conjunction with the breaker moderator to control chlorite break rate. Thus, not only can a fluid contain an effective concentration of magnesium or calcium ions, the fluid can also contain a pH adjusting agent to moderate the chlorite break rate. It is believed that there is low breaking observed at pH values below 11. Further, the fluid degradation rate increases with increasing fluid pH. Thus, the fluid can include a pH adjusting agent present in a sufficient concentration to adjust the pH of the fluid to be at least 10.

The treatment fluid can also include a breaker activator to activate the breaker and decrease the treatment fluid's viscosity. Non-limiting examples of breaker activators for use in the present invention include metal salts such as copper complexes and amine compounds. The optimum or effective concentration of activator depends on factors such as the desired injection period, the particular viscosifying agent and its concentration, the particular breaker, the formation temperature as well as other factors.

The treatment fluid can also include a breaker-activity delaying agent to be used in conjunction with the breaker moderator of the present invention. The breaker activity delaying agent can include any compound or matrix capable decreasing chlorite or hypochlorite solubility in aqueous solution. In other words, any compound or matrix capable of decreasing interaction of the polymer matrix with the chlorite or hypochlorite breaker will work to moderate breaker activity. In that way, chlorite or hypochlorite can dissolve slowly in the treatment fluid and delay the activity of the chlorite or hypochlorite breaker. An example of a breaker activity delaying agent is a system that encapsulates the chlorite or hypochlorite breaker.

Further, it should also be noted that pH adjusting agents can be used in conjunction with the present invention. For example, the pH could be raised towards the end of a job to speed up break rate of alkali metal chlorite or hypochlorite breakers.

The treatment fluid may also include additives such as a proppant, pH control agents, bactericides, clay stabilizers, surfactants, fluid loss additives, scale inhibitors, catalysts, gel stabilizers, and the like that do not adversely react with the other constituents to inhibit performance of the desired treatment upon a subterranean formation. For example, catalysts can be applied in conjunction with the present invention to produce the most controlled break rate at specific temperatures.

Also, when the fracturing fluid is to be used in a formation having a temperature above 175° F., and particularly those formations having a temperature above 225° F., a stabilizer can be added to the gel. The gel stabilizer generally functions to scavenge oxygen from the fluid and to assist in preventing premature gel degradation. A non-limiting example of a gel stabilizer includes sodium thiosulfate. One factor that must be considered in the addition of gel stabilizers into a fluid to achieve higher temperature stability is that the gel stabilizer often interferes with the breaker's ability to effectively reduce gel viscosity within a desired period of time. The reverse is also true in that the breaker can interfere with the stabilizer's ability to stabilize the gel within the subterranean formation.

Thiosulfate can be present as a gel stabilizer in the treatment fluid with a soluble polysaccharide and a chlorite breaker. The kinetics and mechanism of the chlorite and thiosulfate reaction is as follows:

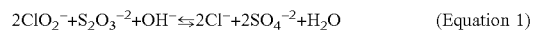

$$2ClO_2^- + S_2O_3^{-2} + OH^- \leftrightharpoons 2Cl^- + 2SO_4^{-2} + H_2O \quad \text{(Equation 1)}$$

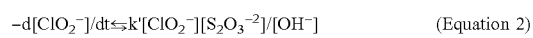

$$-d[ClO_2^-]/dt \leftrightharpoons k'[ClO_2^-][S_2O_3^{-2}]/[OH^-] \quad \text{(Equation 2)}$$

The reaction of chlorite with thiosulfate at high pH is illustrated in Equation 1. The rate equation describing the consumption of chlorite is also presented in Equation 2. Thus, controlling and even changing the pH of the fluid during use can help balance these factors and the timing of the stabilization period and the break time.

In one aspect of the invention, the present invention provides a method of fracturing a subterranean formation penetrated by a well, comprising injecting a treatment fluid into the well and into contact with the formation at a rate and pressure sufficient to fracture the formation. When the treatment fluid of the present invention is used in a fracture stimulation treatment, the treatment fluid is pumped at a rate and pressure such that one or more fractures are formed in the formation. In addition, a particulate solid propping agent can be deposited in the fracture or fractures. The fracture or fractures are propped open by a propping agent whereby produced fluid conducting channels are formed in the formation.

In order to further illustrate the compositions and methods of the present invention, the laboratory procedures and examples are described in more detail.

General Procedures

The general procedure for the samples used in the following examples was to hydrate an 80 lb guar gel (80 lb guar/thousand gallons water) to its near ultimate viscosity. Typically, the gels were mixed for about 30 minutes at ambient conditions and then required additives for the examples were added and mixed.

The guar gel was hydrated using a variety of different waters, including samples of distilled water, deionized water, Duncan tap water (sometimes referred to herein as "DTW"), and field samples of fresh water, including samples from Browning, Tex.; Haynes, La.; and Springhill City, La.

Table 1 summarizes the quantitative analysis of several different waters, including distilled water, deionized water, Duncan tap water, and certain field samples of fresh water, including samples from Browning, Tex.; Haynes, La.; and Springhill City, La. These samples were analyzed for the concentration of certain ions and total dissolved solids ("TDS") in milligrams per liter ("mg/L"), for pH, and for electrical resistivity.

TABLE 1

Water Analysis Results of Field Waters

|  | Distilled | Deionized | Duncan Tap | Browning | Haynes | Springhill |
|---|---|---|---|---|---|---|
| $HCO_3^-$ (mg/L) | 6 | 6 | 153 | 177 | 171 | 250 |
| $Cl^-$ (mg/L) | 25 | 25 | 45 | 37 | 25 | 82 |
| $SO_4^{2-}$ (mg/L) | 0 | 0 | 103 | 11 | 2 | 11 |
| $Ca^{2+}$ (mg/L) | 1 | 0 | 56 | 11 | 13 | 31 |
| $Mg^{2+}$ (mg/L) | 2 | 2 | 27 | 10 | 10 | 16 |
| $Na^+$ (mg/L) | 14 | 15 | 21 | 64 | 49 | 87 |
| TDS (mg/L) | 47 | 48 | 405 | 310 | 270 | 477 |
| pH | 7.39 | 7.00 | 7.44 | 8.08 | 7.97 | 7.05 |
| Resistivity (ohm-m) | 773 | 1717 | 21.0 | 31.5 | 37.3 | 18.8 |

Typical additives to the gelled fluids used in the following examples include a gel stabilizer, a source of chlorite ions, and a pH adjusting agent.

In the following examples, the gel stabilizer was sodium thiosulfate solution at a concentration of 31% w/w in water.

To make a solution of chlorite ions, a dry powder of sodium chlorite (75–84% active) was used, which also included some NaCl and NaOH. The dry powder was used in the concentration of 1 lb/gallon of water to produce a solution of $NaClO_2$ (8% w/w active).

The pH adjusting agent was a sodium hydroxide solution at a concentration of 25% w/w in water.

Typical additives concentrations are listed in Table 2.

TABLE 2

List of Typical Additives Used in Static Break Test Fluids

| | Typical Concentration | |
|---|---|---|
| Additive | Oilfield Units | Laboratory Units |
| High Viscosity guar gum | 80 lb/1,000 gallons water | 1% (w/w) |
| Sodium thiosulfate solution in water (31% w/w) | 3 gal/1,000 gallons water | $8.0 \times 10^{-3}$ M |
| Sodium chlorite solution in water (8% w/w) | 0.25 gal/1,000 gallons water | $2.5 \times 10^{-4}$ M |
| Sodium hydroxide solution in water (25% (w/w)) | 3.2 gal/1,000 gallons water | 0.32% (v/v) |

In addition, magnesium acetate and calcium acetate were used to prepare aqueous solutions to adjust respective ion concentrations. For some of the examples, solutions of alkali metal salts were also added to the mix water before the addition of caustic solution.

Fluid samples of 200 mL were prepared, placed into 8-ounce glass jars, covered with a plastic lid having a vent opening, and then placed into a metal high-pressure vessel. (About 20 mL of water is placed between the annulus of the jar and pressure vessel to aid heat transfer). The pressure vessels were sealed and pressurized to 100 psi with nitrogen and placed into a 270° F. or 275° F. oil bath. After two hours, the vessels were removed and cooled to room temperature, and the viscosity and pH values were recorded.

EXAMPLE 1

In one test, Duncan tap water and deionized water were used in viscosified control fluids for static break tests using sodium chlorite. The sodium chlorite was added to the fluids, which caused a rapid viscosity loss to the sample with deionized water as compared to the sample with Duncan tap water.

FIG. 1 demonstrates the results of static break tests performed at 270° F., comparing the use of various waters to make up the guar gel fluids, including Duncan tap water (sometimes referred to as "DTW") and fresh water field samples from Browning, Tex.; Haynes, La.; and Springhill City, La. The degree of break is reported as a percentage of the ratio of sample viscosity with sodium chlorite to sample viscosity without sodium chlorite, as measured two hours after the addition of the sodium chlorite at a shear rate of 511/second. For Duncan tap water, final viscosity of sample containing sodium chlorite was 77 centipoises ("cp") and viscosity of sample without sodium chlorite was 122 cp. Magnesium concentration in the make-up water for the guar gel fluids is denoted by points connected with line and the value read on the right side y-axis.

Considering the analyses shown in Table 1, the concentrations of magnesium ions and/or calcium ions in the make-up water reasonably correlates to the observed slower the break rate of the chlorite breaker. As illustrated, the break rate of fracturing fluids prepared from Duncan tap water (containing an effective concentration of magnesium ions and/or calcium ions) compared to those prepared from field water samples showed a dramatic difference. Several field water samples exhibited a rapid break rate; that is, they exhibited poor stability with the chlorite breaker. Fluids prepared from Duncan tap water exhibited slower break rates, maintained their viscosity for longer time, and thus are deemed more stable than fluids prepared from other field waters.

EXAMPLE 2

Table 3 shows the break test results to investigate the effect of individual Duncan tap water components added to distilled water. The fluid formulation comprises 80 lb guar per 1,000 gallons of the specific water to be tested, 3 gallons of the sodium thiosulfate solution per 1,000 gallons of water, 3 gallons of the 25% w/w NaOH per 1,000 gallons water, and 0.25 gallon of the sodium chlorite solution per 1,000 gallons of water.

As evident by Table 3, both calcium and magnesium stabilize the fluid (or slow break rate), whereas other components of Duncan tap water, bicarbonate and sulfate showed little effect on break rate. Further, iron (III), another possible difference between the waters, appears to significantly accelerate break rate.

TABLE 3

Distilled Water (With DTW Components Added) Static Break Test at 275° F. (2 hours).

| | Sample No. | | | | | | | |
|---|---|---|---|---|---|---|---|---|
| | 1 | 2 | 3 | 4 | 5 | 6 | 7 | 8 |
| | | | | Water: | | | | |
| | DTW | Dist | Dist + 200 mg/L $HCO_3^-$ | Dist + 100 mg/L $SO_4^{2-}$ | Dist + 50 mg/L $Ca^{2+}$ | Dist + 25 mg/L $Mg^{2+}$ | Dist + 20 mg/L $Fe^{3+}$ | Dist + 50 mg/L $Ca^{2+}$ + 25 mg/L $Mg^{2+}$ |
| | Viscosity at 511/sec (cp) | | | | | | | |
| Initial (72.5° F.) | 107 | 111 | 102 | 101 | 107 | 103 | 175 | 101 |
| Final (73.8° F.) | 47.5 | 12.5 | 13.5 | 13.5 | 25 | 38.5 | 6.5 | 67.5 |
| | pH | | | | | | | |
| Initial | 11.87 | 11.92 | 11.7 | 11.56 | 11.6 | 11.59 | 11.62 | 11.77 |
| Final | 11.5 | 11.39 | 11.16 | 11.32 | 11.52 | 11.5 | 10.56 | 11.5 |

EXAMPLE 3

Figure 2:
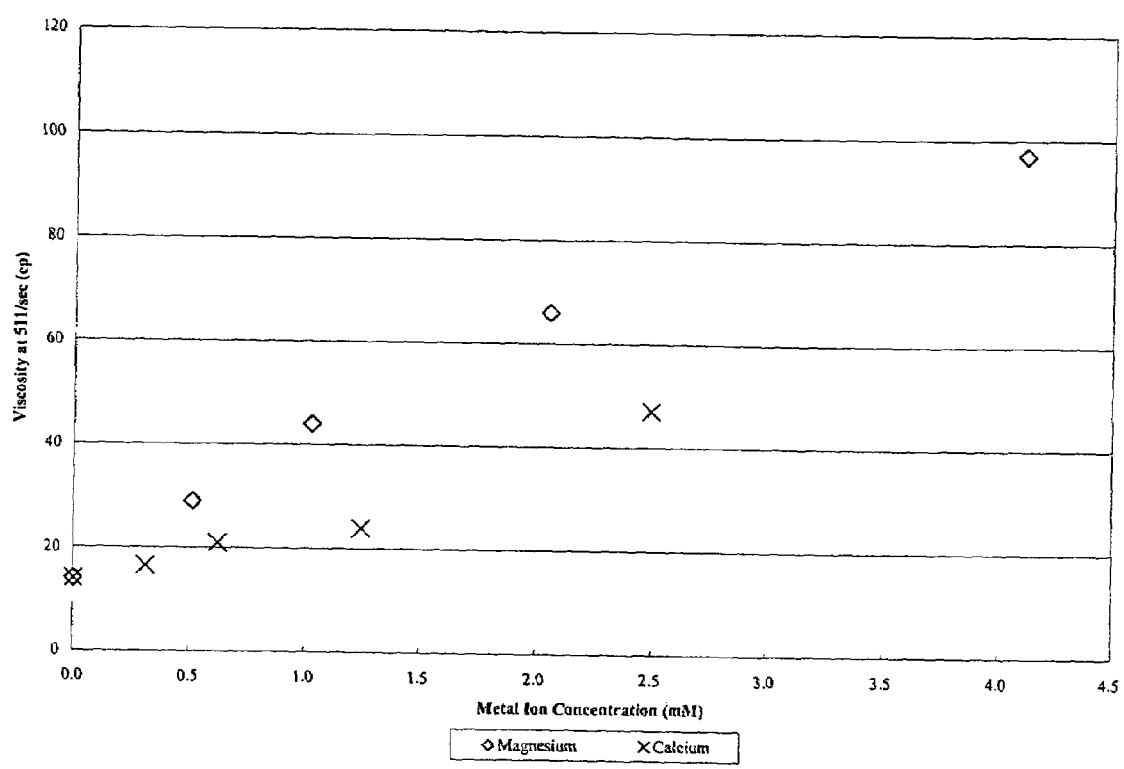
FIG. 2 illustrates static break tests results performed on guar-based fluid samples by varying the concentration of magnesium and calcium ions (Tables 4a and 4b), where viscosity is plotted as a function of metal ion concentration.

FIG. 2 illustrates the static break test results performed on fluids when concentrations of magnesium and calcium ions were varied. Fluid formulation was 80 lb guar per 1,000 gallons of water, 3 gallon of the sodium thiosulfate solution per 1,000 gallons of fluid, 3 gallons of 25% w/w NaOH solution per 1,000 gallons of fluid, and 0.25 gallons of sodium chlorite solution per 1,000 gallons gel fluid, which were individually mixed samples. In this test series, fluid samples were placed into pressure stable cells and heated to 275° F. for two hours, and then cooled. Fluid viscosity was then recorded.

TABLE 4a

Static Break Test at 275° F. (2 hours) using DTW or distilled water ("Dist") and added $Mg^{2+}$ and $Ca^{2+}$.

| | Sample No. | | | | | | | |
|---|---|---|---|---|---|---|---|---|
| | 1 | 2 | 3 | 4 | 5 | 6 | 7 | 8 |
| | DTW | Dist | Dist + 12.5 mg/L $Mg^{2+}$ | Dist + 25 mg/L $Mg^{2+}$ | Dist + 50 mg/L $Mg^{2+}$ | Dist + 100 mg/L $Mg^{2+}$ | Dist + 12.5 mg/L $Ca^{2+}$ | Dist + 25 mg/L $Ca^{2+}$ |
| | Viscosity at 511/sec (cp) | | | | | | | |
| Initial (74° F.) | 118 | 113 | 115 | 116 | 116 | 116 | 118 | 117 |
| Final (72° F.) | 56 | 14 | 29 | 44 | 66 | 97 | 16.5 | 21 |
| | pH | | | | | | | |
| Initial | 11.7 | 11.83 | 11.77 | 11.7 | 11.65 | 11.6 | 11.65 | 11.67 |
| Final | 11.48 | 11.30 | 11.51 | 11.60 | 11.61 | 11.46 | 11.43 | 11.40 |

TABLE 4b

Static Break Test at 275° F. (2 hours) With Ratios of DTW and Distilled Water and Distilled With Added $Ca^{2+}$

| | Sample No. | | | | | | | |
|---|---|---|---|---|---|---|---|---|
| | 1 | 2 | 3 | 4 | 5 | 6 | 7 | 8 |
| | DTW | Dist | 25:75 DTW/Dist | 50:50 DTW/Dist | 75:25 DTW/Dist | Dist + 50 mg/L $Mg^{2+}$ + 50 mg/L $Ca^{2+}$ | Dist + 50 mg/L $Ca^{2+}$ | Dist + 100 mg/L $Ca^{2+}$ |
| | Viscosity at 511/sec (cp) | | | | | | | |
| Initial (71° F.) | 109 | 111 | 103 | 104 | 103 | 92 | 102 | 87 |
| Final (72° F.) | 54 | 13 | 23 | 24.5 | 45 | 85 | 24 | 47 |

TABLE 4b-continued

Static Break Test at 275° F. (2 hours) With Ratios of DTW and Distilled Water and Distilled With Added $Ca^{2+}$

| | Sample No. | | | | | | |
|---|---|---|---|---|---|---|---|
| 1 | 2 | 3 | 4 | 5 | 6 | 7 | 8 |
| | | 25:75 | 50:50 | 75:25 | Dist + 50 mg/L $Mg^{2+}$ + 50 mg/L $Ca^{2+}$ | Dist + 50 mg/L $Ca^{2+}$ | Dist + 100 mg/L $Ca^{2+}$ |
| DTW | Dist | DTW/Dist | DTW/Dist | DTW/Dist | | | |
| | | | | pH | | | |
| Initial 11.91 | 11.96 | 11.95 | 11.9 | 11.86 | 11.73 | 11.75 | 11.76 |
| Final 11.54 | 11.11 | 11.35 | 11.27 | 11.4 | 11.46 | 11.34 | 11.48 |

These results are plotted in FIG. 2 with the ion concentrations reported in millimolar (mM) units. The effect of both magnesium and calcium ions on the chlorite break rate is apparent. As illustrated in FIG. 2, rapid breaking in less than two hours is observed for magnesium ion concentrations below 1 mM and calcium ion concentrations below 2.5 mM.

EXAMPLE 4

Test fluids were made as generally described above, with either Duncan tap water or deionized water; guar at a concentration of 80 lb per 1,000 gallons of the water; a gel stabilizer, i.e., the sodium thiosulfate solution added in the concentration of 3 gallons per 1,000 gallons of the guar fluid; tetramethylammonium chloride that is 50% active, having a concentration of 1.5 gallons per 1,000 gallons of the guar fluid; and sodium chlorite in the concentration of 0.25 gallons per 1,000 gallons of the water.

The effect of varying the pH of the solution on the break rate of sodium chlorite was tested by varying the concentration of sodium hydroxide as a pH adjusting agent in viscosified fluids. The tests were conducted at 270° F.

Table 5 illustrates the effect of pH on the break rate of sodium chlorite. The data shows that with increasing fluid pH, the fluid degradation rate increases. The percentage of original viscosity is also recorded. At a pH below 10, no reduction in viscosity is observed. A trend in break rate is observed with respect to hydroxide concentration. At pH values below 11, there is little breaking observed.

TABLE 5

Effect of Water and pH on Sodium Chlorite Break Rate

| Duncan Tap Water ("DTW") | | Deionized Water | |
|---|---|---|---|
| pH | % Original Viscosity | pH | % Original Viscosity |
| 9.81 | 100 | 9.62 | 100 |
| 10.75 | 98 | 10.55 | 95 |
| 11.2 | 91 | 11.27 | 75 |
| 11.51 | 86 | 11.46 | 43 |
| 11.74 | 80 | 11.67 | 35 |
| 12.15 | 50 | 12.02 | 35 |

EXAMPLE 5

A series of dynamic break tests were also run on a high-borate crosslinked gel fracturing fluid at 275° F.

In this series the fluids were based on a 45 pound guar gum (0.54% guar gum), 1.35 gallons of a delayed borate crosslinker (40% active mineral ulexite in water), and 3.5 gallons of 25% w/w NaOH solution in water, all in 1,000 gallons of make-up water.

Tap water or distilled water was used as the make-up water as stated in the following test runs of the example.

To this basic high-borate fracturing fluid was added 4.25 gallons of a gel stabilizer (the sodium thiosulfate solution in water), all per 1,000 gallons of the basic gel fluid mixture. Thus, the gel stabilizer concentration (thiosulfate) was increased to $1.2 \times 10^{-2}$ M, and the NaOH solution concentration was increased to 0.35% (v/v).

Magnesium ion was added as a solution of magnesium acetate (2.202 grams of Mg $(OAc_2.4H_2O$ in 50 mL distilled water).

To some of the fluid samples used in the following test runs was also added 0.25 gallon of the sodium chlorite solution per 1,000 gallons. For these 275° F. dynamic break tests, a Nordman viscometer similar in design to a Fann Model 50 viscometer was used to measure fluid viscosity with time. A B5X bob with R1 cup was used with a sample size of 35 mL. Sample was sheared at constant shear rate of 80/sec (95 RPM). Sample was heated from ambient temperature to a final temperature of 275° F. at the rate of 5° F./minute. The test duration extended for 120 minutes. Typically, 200 mL fluid samples were prepared in a 500 mL glass blender jar.

The series began with control runs of Duncan tap water and distilled water. Both control runs illustrated a typical slow decline in viscosity over the two hour time period. As the breaker (sodium chlorite solution $2.5 \times 10^{-4}$ M) was added to the sample made-up with Duncan tap water, the viscosity gradually declined to less than 200 cp in about 75 minutes. When the same concentration of chlorite was added distilled water, the viscosity rapidly declined to less than 200 cp in about 25 minutes. The presence of 25 mg/L (or "mpL" in FIG. 3) of $Mg^{+2}$ ions in the fluid sample increased the stability of the break rate and performed in a similar manner to Duncan tap water.

Figure 3:
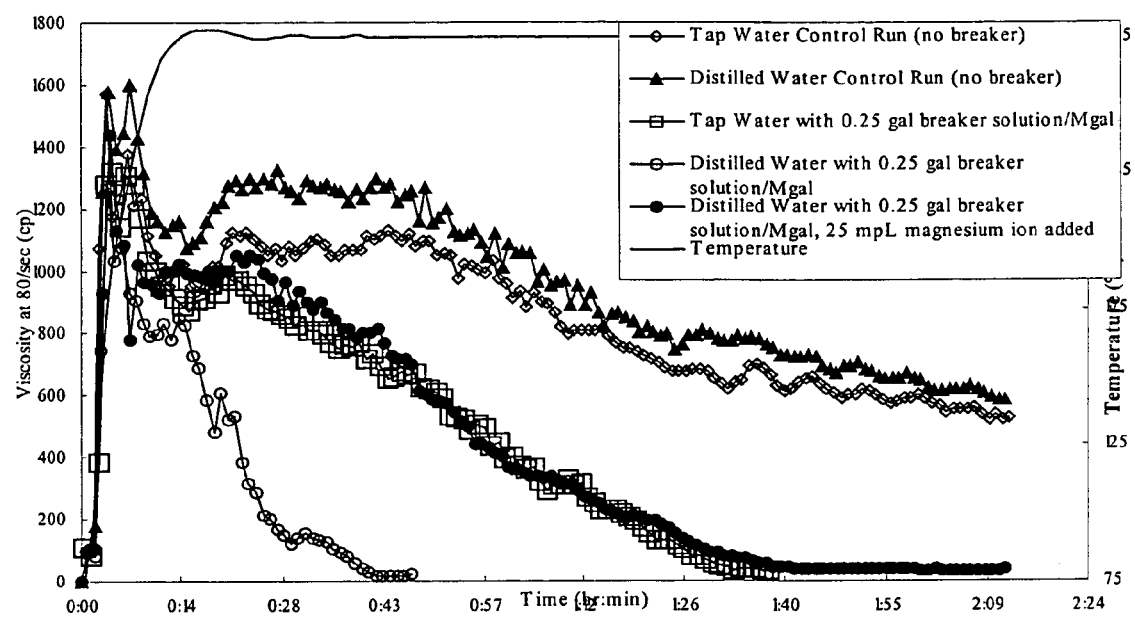
FIG. 3 illustrates testing results obtained for a high-pH borate crosslinked fracturing fluid at 275° F. using a Fann Model 50 type viscometer.

The results of these test runs are illustrated in FIG. 3, and the final pH of the test solutions is shown in Table 6. FIG. 3 is a summary break test results using a high-borate cross-linked fracturing fluid made up with different waters and tested for chlorite break at 275° F. (of Fann Model 50).

TABLE 6

Summary of Fann Model 50 Test Runs

| Fluid | pH final |
| --- | --- |
| DTW control (no breaker) | 11.42 |
| Distilled water control (no breaker) | 11.58 |
| DTW + 0.125 gal sodium chlorite solution | 11.55 |
| DTW + 0.25 gal sodium chlorite solution | 11.60 |
| Distilled water + 0.25 gal sodium chlorite solution | 11.40 |
| Distilled water + 0.25 gal sodium chlorite solution + 25 mg/L Mg | 11.68 |
| Distilled water + 0.25 gal sodium chlorite solution + 25 mg/L Mg | 11.60 |
| Distilled water + 0.25 gal sodium chlorite solution | 11.70 |
| DTW + 0.25 gal sodium chlorite solution | 11.72 |
| Distilled water + 0.25 gal sodium chlorite solution + 25 mg/L Mg | 11.53 |

The invention is described with respect to presently preferred embodiments, but is not intended to be limited to the described embodiments. It will be readily apparent to those of ordinary skill in the art that numerous modifications may be made to the invention without departing from the scope and spirit of the invention as defined by the claims.

What is claimed is:

1. A method of treating a subterranean formation penetrated by a well, the method comprising the steps of:
    (a) forming a treatment fluid comprising:
        1) water having a magnesium ion concentration of less than 1 mM and a calcium ion concentration of less than 2.5 mM;
        2) a water-soluble polysaccharide capable of increasing the viscosity of the water and present in a sufficient concentration to increase the viscosity of the water; and
        3) a breaker comprising at least one member selected from the group consisting of a source of chlorite ions and a source of hypochlorite ions, wherein the breaker is present in a sufficient concentration to break the viscosity of the treatment fluid after introduction of the fluid into the subterranean formation;
    (b) at any stage of forming the treatment fluid, adding a breaker moderator comprising at least one member selected from the group consisting of a source of magnesium ions and a source of calcium ions to provide a sufficient concentration of the breaker moderator to reduce the break rate of the fluid compared to the treatment fluid without the addition of the breaker moderator; and
    (c) introducing the treatment fluid into the well and into contact with the formation.

2. The method of claim 1, wherein the formation has a static temperature of 200° F. and above.

3. The method of claim 2, wherein the formation has a static temperature of up to 350° F.

4. The method of claim 3, wherein the step of introducing the treatment fluid into the well and into contact with the formation is at a rate and pressure sufficient to fracture the formation.

5. The method of claim 4, wherein the treatment fluid further comprises a proppant.

6. The method of claim 4, wherein the breaker comprises at least one member selected from the group consisting of alkali metal chlorites.

7. The method of claim 6, wherein the breaker comprises sodium chlorite.

8. The method of claim 6, wherein the breaker moderator comprises at least one member selected from the group consisting of a source of magnesium ions.

9. The method of claim 8, wherein the breaker moderator comprises at least one member selected from the group consisting of magnesium chloride, magnesium acetate, and magnesium sulfate.

10. The method of claim 6, wherein the breaker moderator comprises at least one member selected from the group consisting of: calcium chloride, calcium acetate, and calcium nitrate.

11. The method of claim 6, wherein the fluid further comprises a pH adjusting agent present in a sufficient concentration to adjust the pH of the fluid to be at least 10.

12. The method of claim 4, wherein the breaker moderator comprises at least one member selected from the group consisting of a source of magnesium ions.

13. The method of claim 3, wherein the treatment fluid is adapted to break within 1 to 24 hours after being introduced into the well and into contact with the formation.

14. The method of claim 3, wherein the polysaccharide comprises at least one member selected from the group consisting of galactomannans, modified or derivatized galactomannans, and cellulose derivatives.

15. The method of claim 3, wherein the polysaccharide comprises at least one member selected from the group consisting of guar, hydroxypropylguar, carboxymethylhydroxypropylguar, carboxymethylhydroxyethylcellulose, carboxymethylcellulose, and hydroxyethylcellulose grafted with vinylphosphonic acid.

16. The method of claim 1, wherein the step of introducing the treatment fluid into the well and into contact with the formation is at a rate and pressure sufficient to fracture the formation.

17. The method of claim 1 further comprising a crosslinking agent, wherein the crosslinking agent comprises at least one member selected from the group consisting of borate-releasing compounds, a source of titanium ions, a source of zirconium ions, a source of antimony ions, and a source of aluminum ions.

18. The method of claim 17, wherein the borate releasing compound comprises ulexite.

19. The method of claim 1, wherein the breaker comprises at least one member selected from the group consisting of alkali metal chlorites.

20. The method of claim 1, wherein the breaker moderator comprises at least one member selected from the group consisting of a source of magnesium ions.

21. The method of claim 1, wherein the breaker moderator comprises at least one member selected from the group consisting of: calcium chloride, calcium acetate, and calcium nitrate.

22. The method of claim 1, wherein the fluid further comprises a pH adjusting agent present in a sufficient concentration to adjust the pH of the fluid to be at least 10.

23. A method of treating a subterranean formation penetrated by a well, the method comprising the steps of:
    (a) forming a treatment fluid comprising:
        1) water having a magnesium ion concentration of less than 1 mM and a calcium ion concentration of less than 2.5 mM;
        2) a water-soluble polysaccharide capable of increasing the viscosity of the water and present in a sufficient concentration to increase the viscosity of the water;

3) a breaker comprising at least one member selected from the group consisting of a source of chlorite ions and a source of hypochlorite ions, wherein the breaker is present in a sufficient concentration to break the viscosity of the treatment fluid after introduction of the fluid into the subterranean formation;

(b) at any stage of forming the treatment fluid, adding at least one member selected from the group consisting of a source of magnesium ions and a source of calcium ions to provide a magnesium ion concentration of at least 1 mM or a calcium ion concentration of at least 2.5 mM or both; and (c) introducing the treatment fluid into the well and into contact with the formation.

24. The method of claim 23, wherein the fluid comprises a pH adjusting agent present in a sufficient concentration to adjust the pH of the fluid to be at least 10.

25. The method of claim 23, wherein the fluid comprises a pH adjusting agent present in a sufficient concentration to adjust the pH of the fluid to be at least 11.

26. The method of claim 25, wherein the fluid further comprises thiosulfate.

27. The method of claim 26, wherein the formation has a static temperature of at least 200° F.

28. The method of claim 23, wherein the fluid further comprises thiosulfate.

29. The method of claim 23, wherein the step of introducing the treatment fluid into the well and into contact with the formation is at a rate and pressure sufficient to fracture the formation.

30. The method of claim 23, wherein the breaker moderator comprises at least one member selected from the group consisting of magnesium chloride, magnesium acetate, and magnesium sulfate.

31. The method of claim 23, wherein the breaker moderator comprises at least one member selected from the group consisting of: calcium chloride, calcium acetate, and calcium nitrate.

32. The method of claim 23, wherein the fluid further comprises a crosslinking agent.

33. The method of claim 32, wherein the crosslinking agent is a borate crosslinking agent.

34. The method of claim 32, wherein the fluid comprises a pH adjusting agent present in a sufficient concentration to adjust the pH of the fluid to be at least 11.

35. The method of claim 32, wherein the fluid further comprises thiosulfate.

36. The method of claim 32, wherein the formation has a static temperature of at least 200° F.

37. The method of claim 32, wherein the fluid further comprises thiosulfate.

* * * * *